United States Patent [19]
Green

[11] Patent Number: 5,274,695
[45] Date of Patent: Dec. 28, 1993

[54] SYSTEM FOR VERIFYING THE IDENTITY OF A CALLER IN A TELECOMMUNICATIONS NETWORK

[75] Inventor: John E. Green, San Bruno, Calif.

[73] Assignee: U.S. Sprint Communications Company Limited Partnership, Kansas City, Mo.

[21] Appl. No.: 640,218

[22] Filed: Jan. 11, 1991

[51] Int. Cl.⁵ .................................... H04M 1/64
[52] U.S. Cl. .......................... 379/88; 379/89; 379/112; 379/201; 379/245; 379/91; 379/189
[58] Field of Search .............. 379/67, 88, 89, 112, 379/201, 91, 245, 246

[56] References Cited

U.S. PATENT DOCUMENTS

| | | | |
|---|---|---|---|
| Re. 31,188 | 3/1983 | Pirz et al. | |
| Re. 32,012 | 10/1985 | Pirz et al. | |
| 4,092,493 | 5/1978 | Rabiner et al. | |
| 4,348,550 | 9/1982 | Pirz et al. | 379/360 |
| 4,853,952 | 8/1989 | Jachmann et al. | 379/96 |
| 4,896,346 | 1/1990 | Belfield et al. | |
| 4,922,522 | 5/1990 | Scanlon | 379/88 |
| 4,954,958 | 9/1990 | Savage et al. | 379/88 |
| 5,018,736 | 5/1991 | Pearson et al. | 379/95 |
| 5,127,043 | 6/1992 | Hunt et al. | 379/88 |

OTHER PUBLICATIONS

Article "Using Cepstral Features in Speaker Verification"; by M. Birnbaum et al.; AT&T Information Systems.
Article "Password Controlled Switching System"; by Belfield et al.

Primary Examiner—James L. Dwyer
Assistant Examiner—Fan Tsang
Attorney, Agent, or Firm—Hovey, Williams, Timmons & Collins

[57] ABSTRACT

A system (10) for verifying the identity of a caller in a telecommunications network uses a voice-responsive control device (28) to compare spoken utterances of callers with previously stored voice templates. In preferred forms, the caller speaks an utterance of an identification number which is decoded independently of the speaker thereof and then used to retrieve corresponding voice template identified thereby. In other preferred forms, the ANI of a calling station (18) is delivered to the control device which uses the ANI to retrieve the caller's voice template identified thereby.

14 Claims, 3 Drawing Sheets

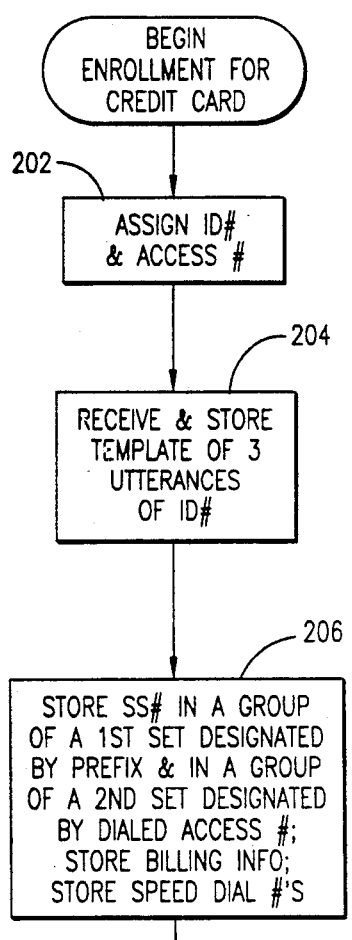
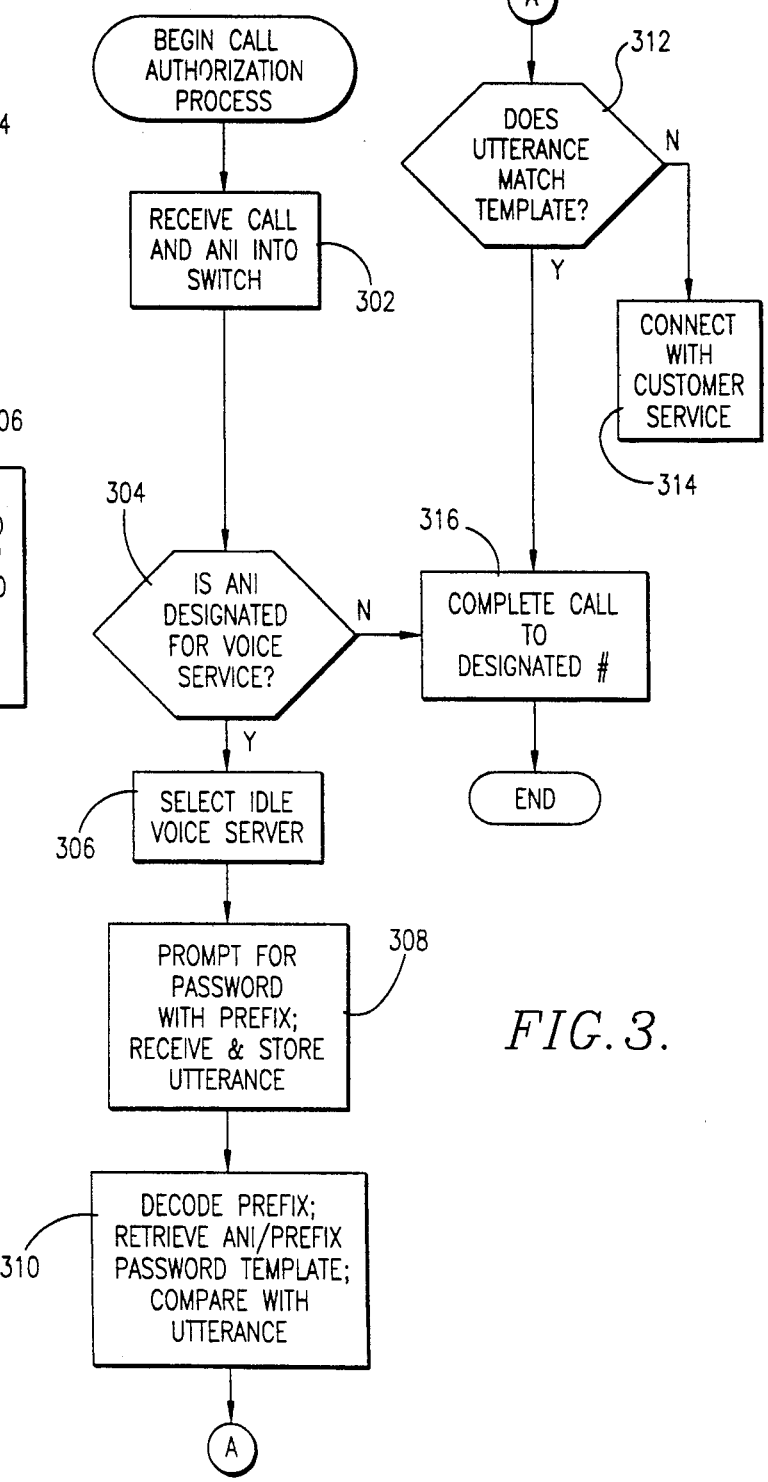
FIG. 2A.
FIG. 3.

SYSTEM FOR VERIFYING THE IDENTITY OF A CALLER IN A TELECOMMUNICATIONS NETWORK

BACKGROUND OF THE INVENTION

1. Field of the Invention

The present invention is concerned with the field of telecommunications and, in particular, with a system for verifying the identity of callers wishing to place calls over a telecommunications network by using a voice-responsive control device connected to the network to compare spoken utterances of callers with previously stored voice templates.

2. Description of the Prior Art

Telecommunications carriers, and in particular long distance telephone companies, lose considerable revenue because of telephone credit card abuse. For example, so-called "hackers" use computers to generate credit card numbers and to test these numbers until a valid number is found. This apparently valid credit card number can be sold to others for making toll calls for which no payment can be billed and collected. Similarly, if a telephone credit card is lost or stolen, considerable false charges can be generated before the number can be invalidated.

In order to minimize the effect of "hackers", credit card numbers with many digits are used which makes it much more difficult and time consuming for the hacker to generate a valid number. This technique, in combination with analysis of usage patterns, can minimize credit card abuse. This solution, however, creates inconvenience for customers who must dial more digits than would otherwise be necessary and, because so many digits must be dialed, errors are more likely, which may require the customer to redial creating even more inconvenience.

Business and residential customers are also subject to billings for unauthorized direct-dial toll calls placed from calling stations for which the business or resident are responsible. Accordingly, the prior art points out the need for a system which allows only authorized callers to place toll calls.

SUMMARY OF THE INVENTION

The prior art problems discussed above are solved by the system of the present invention. That is to say, the system hereof verifies the identity of the caller by comparing a spoken utterance of the caller with a stored voice template.

Broadly speaking, the system hereof connects a voice responsive control device to a telecommunications network, the device being operable for storing and retrieving a voice template, for decoding and storing a spoken utterance, and for comparing the utterance with the template. In one embodiment, a caller is enrolled by assigning to the caller an identification number, preferably the caller's social security number which is unique to and easily remembered by the caller, and by storing a voice template of the caller speaking the identification number which also identifies the template for retrieval. A spoken utterance of the identification number from the caller is received over the network, stored and decoded independently of the speaker thereof. In response, the template identified by the identification number is retrieved and the spoken utterance compared to the template. If it matches, thereby verifying the identity of the caller, the network completes the call.

In another embodiment, the network prevents completion of direct-dial toll calls originating at selected calling stations as indicated by the automatic number identification (ANI). Instead, selected calling stations are placed in communication with the voice responsive control device when a toll call is dialed. The caller is then prompted to speak an assigned passcode which may be the credit card identification number discussed above if the caller is so enrolled. The passcode utterance is then compared to a previously stored voice template of the caller speaking the passcode. If a match is achieved, the network completes the call. Other preferred aspects of the present invention are discussed further hereinbelow.

BRIEF DESCRIPTION OF THE DRAWING FIGURE

FIG. 2A is a flowchart representing the enrollment procedure of the present invention;

FIG. 3 is a flowchart representing the operation of the network in accordance with the present invention for authorization of calls from a designated calling station.

DETAILED DESCRIPTION OF THE PREFERRED EMBODIMENT

Figure 1:
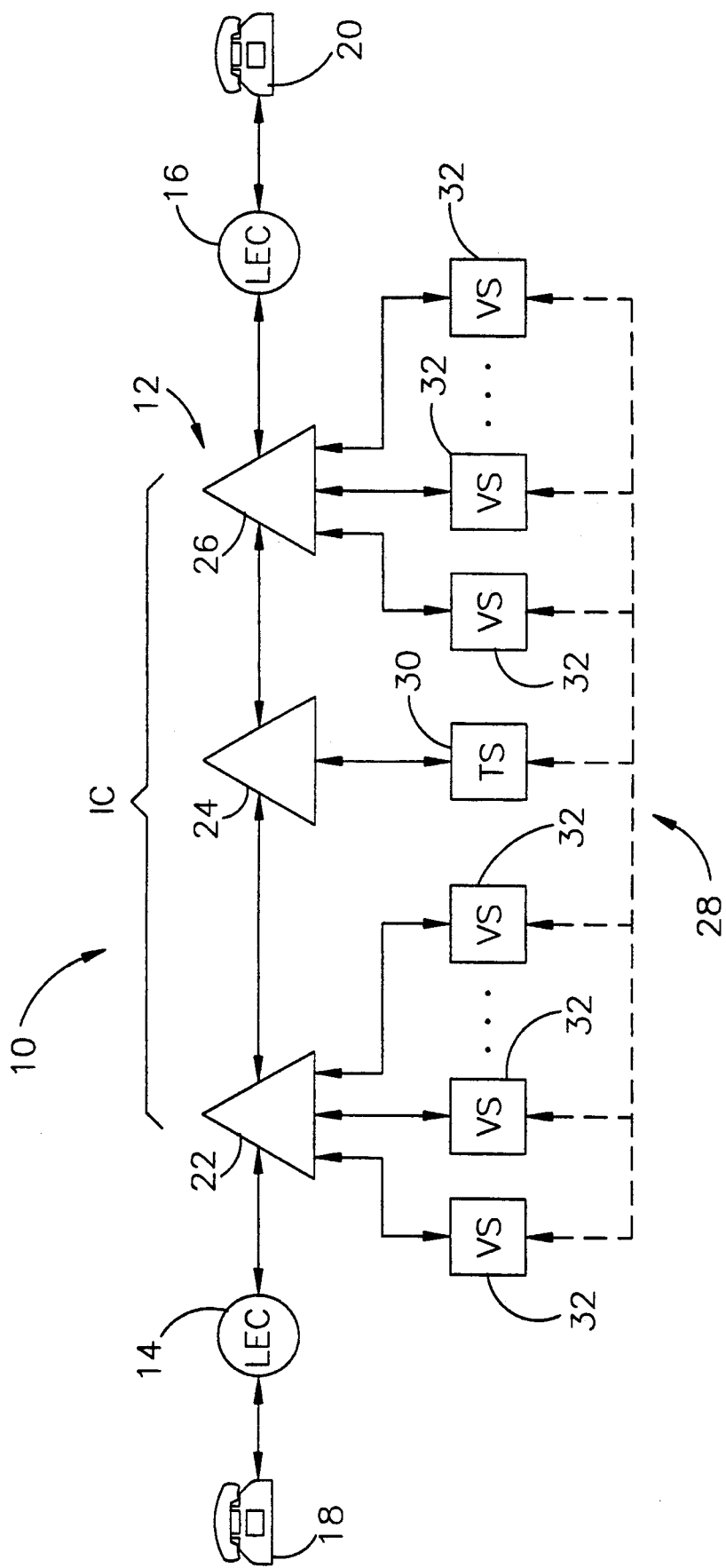
FIG. 1 is a schematic representation of a telecommunications network including calling stations, local exchange carriers (LEC), and an interexchange carrier (IC) network.

FIG. 1 is a schematic representation of a telecommunications network 10 illustrating an interexchange carrier (IC) network 12 connected to respective local exchange carriers (LEC) 14 and 16 which are, in turn, are connected to respective calling stations 18 and 20. Network 12 includes a plurality of switches 22, 24 and 26, and voice responsive control devices 28 connected to the network at switches 22–26.

As those skilled in the art will appreciate, IC network 12 carries long distance telecommunications traffic including voice and data between local exchange carriers or between local access transport areas (LATA's). The local telephone companies provide "plain old telephone service" (POTS) to individual customers at individual calling stations represented by stations 18 and 20. The stations may include residential telephones, business PBX's, pay telephones, computer modems and so forth for providing communication interfaces with network 10.

Control device 28 is operable to store retrievable voice templates, to receive and store spoken utterances of passcodes, to decode, that is, recognize spoken words and digits, and to compare the utterances with identified voice templates. Such devices are well known to those skilled in the art such as that disclosed in *AT&T Technical Journal*, Sept/Oct, 1986, Vol. 65, No. 5 incorporated herein by reference, and known as the CONVERSANT I voice system available from AT&T, or that disclosed in the article entitled "Using Cepstral Features in Speech Verification" published in *SPEECH TECH '86*, pages 287–290, incorporated herein by reference.

Preferred control device 28 is provided by Texas Instruments, Inc. of Dallas, Texas and includes template storage (TS) unit 30 connected to switch 24 and a plurality of voice servers (VS) 32 connected to switches 22,26. Template storage unit 30 is operable to store digitally encoded, voice templates of spoken utterances of assigned passcodes which may include passwords, identification numbers, or alphanumeric combinations.

Voice servers 32 are operable to receive and store spoken utterances of passcodes, and in the preferred embodiment are operable to decode spoken utterances of identification numbers into the respective digits independently of the speaker thereof. Additionally, voice servers 32 are operable to retrieve the appropriate voice template as identified by the decoded identification number, and to compare the stored utterance to the retrieved template to determine if the two match according to predefined criteria. In the preferred device 28, and as used herein, a template and the stored utterance are the numerical results of an algorithmic application of various tests and analyses on the utterances; a match, when applied to the stored utterance and the template, means that the various test results applied to both result in scores that are within a predefined deviation of one another.

In the preferred embodiment, a plurality of voice servers 32 are connected to each switch in interexchange carrier network 12, with each server 32 operable to handle a plurality of calls. The number of voice servers connected to each switch depends upon the anticipated level of traffic originating at that switch. Each switch is programmed to respond to the dialing of one of ten preassigned toll-free access numbers, or to the dialing of a direct-dial toll call from designated calling stations, by placing the station from which a call originated into communication with one of voice servers 32. In addition, each switch is also configured to "hunt" for an idle voice server and to transmit the dialed access number, or the ANI (automatic number identification) of a designated calling station, to the selected voice server 32.

Template storage unit 30 stores all of the voice templates of callers enrolled in the system and is located where most convenient for data transfer with voice servers 32. Preferably, an additional storage unit is also connected to the network for back-up. The digital data communication paths 34 between unit 30 and voice servers 32 are indicated by the dashed lines in FIG. 1 and are representative of fast-frame packet data flow. With this arrangement, the exact physical location in the network of template storage unit 30 is not significant from an operational standpoint, but rather the location is chosen for convenient maintenance and servicing such as at a data control point (DCP).

Figure 2B:
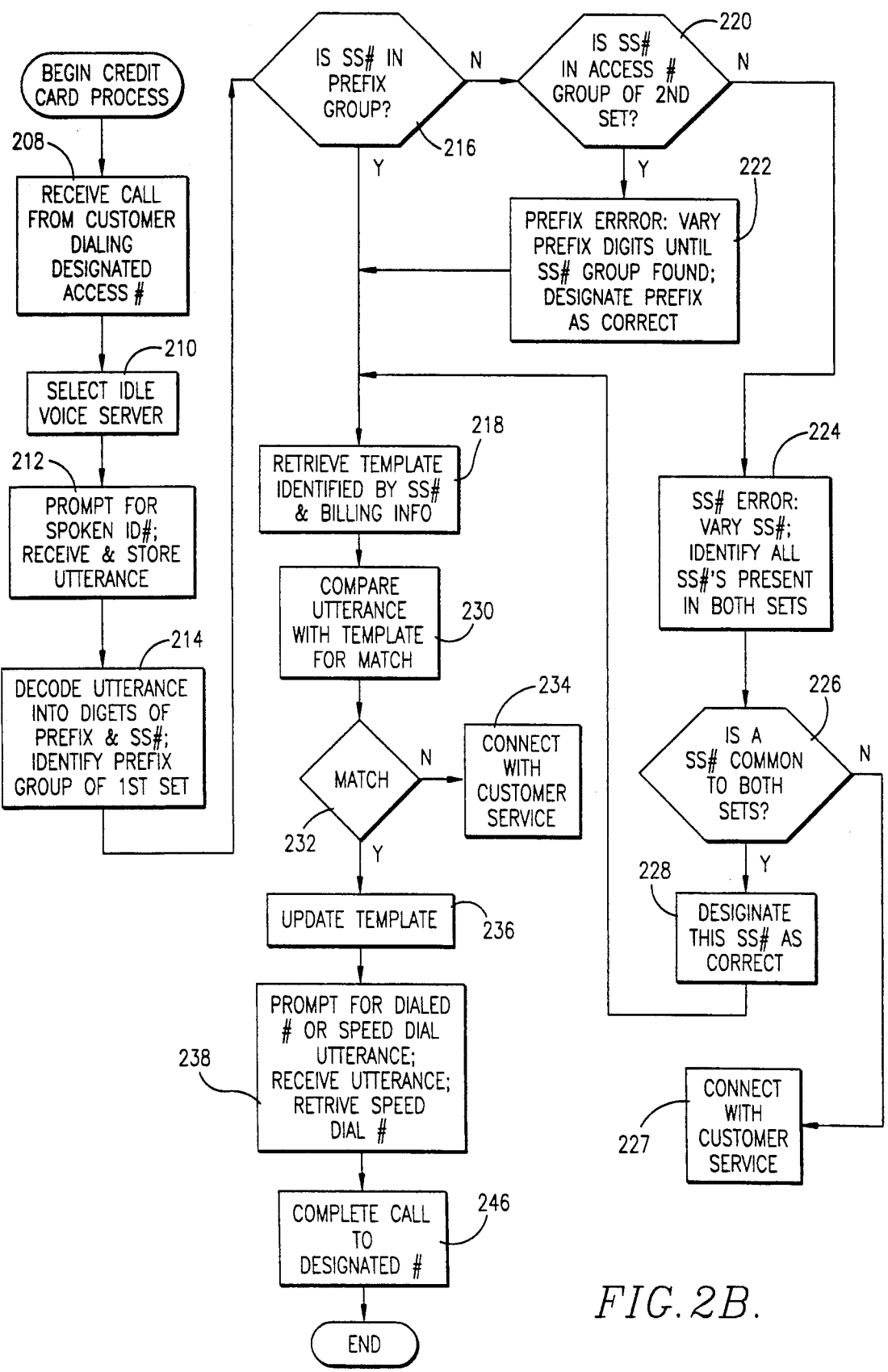
FIG. 2B is a flowchart representing the operation of the network in accordance with the present invention for credit card calls.

In the preferred use of the present invention for credit card toll calls, each caller is enrolled (FIG. 2A) by first assigning (step 202) an identification number and one of ten toll free access numbers to the customer. The customer then dials a customer service number for enrollment over the network and speaks three utterances of the assigned identification number from which a voice plate is created and identified for retrieval by the identification number (step 204). The enrolled caller's billing account number is also stored in association with the template so that when the template is retrieved by one of voice servers 32, the appropriate billing number is also retrieved.

The preferred identification number includes a single digit prefix number and the enrolled caller's social security number. The inclusion of the social security number is an advantageous feature of the present invention because the social security number is unique to and is easily remembered by the caller, and thereby provides substantial convenience to the customer.

The prefix number designates different billing accounts for the caller and is also used for number validation and error correction. For billing purposes, one prefix number might designate the caller's home billing account and another might designate a business billing account. In the alternative, the additional number could be a suffix to the social security number if desired.

In the preferred validation and error correction scheme, the social security numbers are arranged into two sets of groups of social security numbers with each social security number being included in one of the groups of each set (step 206). The prefix numbers designate respective groups in the first set. The preassigned, toll-free, access numbers designate respective groups in the second set. In each group, no two social security numbers are included which differ from one another by only one digit. With this scheme, an error of only one digit in decoding a spoken utterance of an identification number will not result in a valid identification number, that is, will not produce a number included in the group identified by the prefix or access number, but will allow determination of the correct identification number despite the error, as explained further hereinbelow.

After enrollment, a caller wishing to place a credit card call, dials his or her preassigned, toll-free access number from calling station 18. The call and the dialed access number are transmitted by way of LEC 14 to originating switch 22 which, in response to receipt of the access number, selects an idle voice server 32 (step 210) connected to switch 22 and places station 18 in communication with the selected voice server. Switch 22 also transmits the dialed access number to the selected voice server for use in the validation and error correction scheme.

The caller is then prompted (step 212), preferably by means of a synthetically generated voice, to speak the caller's identification number which includes the assigned prefix number an the caller's social security number. Voice server 32 stores and decodes (step 214) the spoken utterance into the numerical digits of the identification number. If the decoded social security number is included in a group corresponding to the associated prefix number, a valid identification number is indicated (step 216). Voice server 32 then uses (step 218) the identification number to retrieve the corresponding voice template identified thereby from template storage unit 30. The associated billing account number is also retrieved.

The stored utterance of the social security number portion of the identification number is then compared to the template (step 230). If a match is indicated (step 232), the identity of the caller is verified. Voice server 32 then prompts switch 22 to complete the call in the conventional manner (step 240) and provides switch 22 with the customer's billing number. The stored utterance is also transmitted to template storage unit 30 to update the template on an weighted average basis (step 236). In this way, the stored template reflects the current voice characteristics of the caller.

If a single-digit error occurs in recognizing the identification number, then the decoded social security number portion does not correspond to the prefix number. If such occurs, the decoded social security number is then compared to the group identifier of the dialed access number (step 220). If valid, then it is known that the decoded social security number is correct and that the 5 digit recognition error is with the prefix number. The prefix digit is then varied (step 222) one digit at a time until it corresponds to the group including the social security number. This completed combination is deemed to be the correct identification number and is used to retrieve the template identified thereby.

If, on the other hand, the comparison with the access number group identifier also indicates an invalid identification number, then it is known that the error is one of the digits of the social security number. Each digit of the social security number is then varied (step 224) one at a time from 0 through 9 and each newly generated number is tested to determine if it is a valid number. This process is conducted for both sets corresponding to the prefix number and the access number. All valid social security numbers so generated are temporarily stored. If the digit error involved only one digit, then one and only one, stored social security number will be common (step 226) to both sets which is deemed (step 228) to be the correct social security number.

If the decoding error involves two or more digits, then no stored social security numbers will be common to both sets. In this case, the caller is prompted to again speak the identification number and the process is repeated. If unsuccessful the second time, voice server 32 transfers the call to a customer service representative (step 227) to resolve the problem. Because of the error correction scheme, an error in recognizing one of the spoken digits is quickly corrected and does not result in any noticeable delay to the caller. In other words, the caller is not even aware that the error correction process occurred.

In the preferred voice server 32, the error correction process is accomplished using two polynomials developed using conventional mathematical information theory techniques for generating the respective group designations. Using these techniques, a caller's social security number is used as input to the first polynomial which generates a single output digit which is the assigned prefix number. The social security number is also used as input to the second polynomial which generates another single output digit (0 through 9) as a group identifier corresponding to one of the ten, preassigned, toll-free access numbers.

The use of these two polynomials allows the error correction process to be even more quickly accomplished. In other words, upon decoding the identification number, the social security number portion is provided as input to the first polynomial and the resulting digit compared to the decoded prefix number. If a match is achieved, the identification number is deemed valid and the template retrieved as identified thereby. If this first check does not indicate a valid number, then the social security number is provided as input to the second polynomial and the error correction process proceeds as discussed above.

As can be appreciated from the above discussion, a caller wishing to place a credit card toll call need only dial the assigned toll free access number and speak his or her social security number with the assigned prefix. This eliminates the need for dialing a fourteen-digit credit card number and presents a much more convenient process to the caller.

In order to provide even greater convenience, voice servers 32 are also operable to recognize a limited vocabulary of spoken words which, in the preferred embodiment, include so-called "speed dial" designations such as "call home" and "call office", among others which may be defined. Upon verification of the caller's identity when a successful match is achieved between spoken utterance and the voice template, the caller is prompted to enter the called number (step 238). This may be entered by conventional dialing, or by speaking one of the "speed dialing" entries. In response, voice server 32 decodes the spoken speed dial utterance and retrieves the corresponding telephone number for the caller. During the enrollment process, the telephone numbers corresponding to the caller's speed dial entries are also stored in correspondence with the identification number (step 206). Thus, when the caller speaks "call home", for example, voice server 32 retrieves the caller's home telephone number corresponding to the caller's identification number and the speed dial entry, and provides the speed dial number to switch 22 which then completes the call accordingly (step 240).

From the description above, those skilled in the art will appreciate that the invention hereof virtually eliminates all possibility of computer hackers gaining the ability to place unauthorized toll calls. First, a hacker cannot test computer generated credit card numbers for validity because a passcode must be spoken. Even if a valid passcode such as the preferred identification number is known, an impostor's spoken utterance of the passcode would not match the stored voice template of the authorized customer.

Additionally, lost or stolen telephone credit cards would not be subject to abuse because there is no need to print the identification number, for example, on the credit card because the identification number is the user's social security number which is easily remembered. Furthermore, as mentioned above, even if an impostor knows a valid identification number, the impostor's spoken utterance thereof would not match the stored voice template of the authorized caller.

In another embodiment FIG. 3, the present invention can also be used for verifying the identity a caller placing a direct dial toll call from a designated calling station. Initially, calling stations being provided with this service are designated by programming the switch at which direct-dial toll calls originate to divert the calls originating therefrom to a selected voice server (step 306), instead of completing the calls over the network. As those skilled in the art are aware, the local exchange carrier forwards the ANI (automatic number identification of the palling station to the originating switch of the interexchange carrier (step 302). In this way, the originating witch can identify those toll calls placed from a designated calling station (step 304).

Callers authorized to place toll calls from the designated station are then enrolled in the same manner as described above in connection with credit card calls, and the verification process proceeds in the same way. The only difference is that the toll calls can be billed to the billing account identified by the ANI instead of the credit card number, if such is desired by the customer.

In the alternative, callers authorized to place toll calls from the designated station can be enrolled with respective passwords which are identified for retrieval by the ANI of the calling station (step 308). In this mode, the passwords are identified for retrieval by the ANI and the voice server compares the utterance of the caller's spoken password, with all of the templates associated with that ANI (step 310). If a match is indicated (step 312), the voice server signals the switch to complete the call (step 316).

If a large number of callers are authorized to place toll calls from the designated station, it may take too long a period of time to compare the password utterance with all of the ANI-associated voice templates. In such cases, each authorized caller could be assigned a short identification number in addition to the password which, as a suffix to the ANI, would be sufficient to identify the caller's specific template (step 308). For example, if fewer than one-hundred callers are authorized for a given station, a two-digit suffix could be assigned to each authorized caller who would enter this suffix by speaking it in addition to the password for decoding as described above. If speaker-independent voice recognition capability is not present in the voice server, the additional suffix could be dialed by the caller.

In use, a caller wishing to place a toll call from calling station 18 to station 20 for example, would pick up the handset and dial the direct dial telephone number of station 20 in the conventional manner. In response, LEC 14 transmits the call to originating switch 22 which, upon receiving the ANI (steps 302, 304) of calling station 18 transmitted thereto by LEC 14, would select an idle voice server 32 (step 306) and place calling station 18 in communication therewith, instead of routing the call directly to station 20. Switch 22 also transmits the calling station ANI to the selected voice server. The caller is then prompted to speak the assigned passcode (step 308) after which voice server 32 retrieves the appropriate voice template identified by the ANI from the template storage unit 30, and compares the utterance with the template (301). If a match is indicated (step 312) thereby verifying the identity of the caller, voice server 32 signals switch 22 to complete the call (step 316).

As mentioned above, if the caller is already enrolled as a credit card customer, the passcode could be the credit card identification number, e.g., the caller's social security number, and the call billed to the credit card account, or to the ANI account in accordance with the customer's wishes. If passwords are used and only a few callers, less than ten, for example, are authorized to place toll calls from station 18, the corresponding passcodes identified by the ANI station 18 are retrieved and the caller's spoken utterance compared to each of them. On the other hand, if a large number of callers are authorized to place toll calls from station 18, the caller, after dialing the direct dial number of station 20, would then speak the proper password and then dial or speak the suffix number which is appended to the ANI to identify that specific caller's voice template for retrieval. The speed dial feature described above would also be available for authorized callers from station 18.

As can be appreciated, the present invention prevents unauthorized persons from making toll calls from a designated calling station. That is to say, the requirement that each caller speak a verifiable utterance prevents unauthorized persons from using a designated calling station for toll calls. Additionally, with the caller of each toll call being specifically identified, the present invention allows the billing statements to indicate the identity of the person making each toll call charged to that station. This allows monitoring of each authorized person's toll calls for accounting purposes and for preventing abuse.

As those skilled in the art will appreciate, the present invention encompasses many variations in the preferred embodiments described herein. For example, while identification numbers are preferred, passwords or alphanumeric combinations could be used equivalently in many applications.

Additionally, the voice servers and template storage unit could be connected to the network at other locations. For example, in some circumstances, it might not be necessary for each switch to be connected to a set of voice servers. Instead, the voice servers could be connected to selected switches in order to minimize capital costs. As another example, a number a template storage units could be distributed throughout the network with each storing a portion of the templates rather than storing all the templates on a high capacity unit, or with each unit having the capability of capturing and storing templates temporarily from other units. Furthermore, the functions of the voice servers and template storage units could be combined into a single device connected to the network for handling calls directed thereto.

Having thus described the preferred embodiments of the present invention, the following is claimed as new and desired to be secured by Letters Patent:

1. In a telecommunications network operable for completing a call placed by a caller and for delivering the ANI of the calling station from which the call is placed, a method of operating the network for verifying the identity of the caller, said method comprising the steps of:

connecting voice responsive control means with the network, said control means being operable for storing and retrieving a voice template, for storing a spoken utterance, and for comparing the utterance with the template;

initially preventing completion of calls over the network originating from calling stations associated with a predefined group of ANI's;

enrolling a caller by assigning a passcode to the caller, by storing a retrievable voice template of the caller speaking said passcode, and by associating said template for retrieval with an ANI associated with the caller;

delivering and storing a spoken utterance of said passcode and the ANI of the station from which the call originated when the call originates from an ANI-associated calling station included in said predefined group, and retrieving said template associated with said passcode and ANI;

comparing said stored utterance with said template; and completing the caller's call if said stored utterance matches said template thereby verifying the identity of the caller, said method further including the steps of enrolling a plurality of callers thereby assigning a respective plurality of passcodes thereto and storing a respective plurality of voice templates thereof associated with the same ANI, said comparing step including the step of comparing said spoken utterance with said plurality of templates corresponding to the ANI associated with the caller, said completing step including the step of completing the call if said spoken utterance matches one of said templates.

2. The method as set forth in claim 1 further including the steps of:

placing the calling station from which the caller is placing the call in communication with said control means in response to the dialing of a toll call number for delivery of said utterance to said control means.

3. In a telecommunications network operable for completing a call placed by a caller and for delivering the ANI of the calling station from which the call is placed, a method of operating the network for verifying the identity of the caller, said method comprising the steps of:

connecting voice responsive control means with the network, said control means being operable for storing and retrieving a voice template, for storing a spoken utterance, and for comparing the utterance with the template;

initially preventing completion of calls over the network originating from calling stations associated with a predefined group of ANI's;

enrolling a caller by assigning a passcode to the caller, by storing a retrievable voice template of the caller speaking said passcode, and by associating said template for retrieval with an ANI associated with the caller;

delivering and storing a spoken utterance of said passcode and the ANI of the station from which the call originated when the call originates from an ANI-associated calling station included in said predefined group, and retrieving said template associated with said passcode and ANI;

comparing said stored utterance with said template; and completing the caller's call if said stored utterance matches said template thereby verifying the identity of the caller, said method further including the steps of enrolling a plurality of callers thereby assigning a respective plurality of passcodes thereto and storing a respective plurality of voice templates thereof associated with the same ANI, and assigning an individual identification number to each caller and further identifying the caller's template with said identification number, said delivering step including the step of delivering said identification number to said control means, said retrieving step including the step of retrieving said template in accordance with said identification number.

4. In a telecommunications network operable for completing a call placed by a caller and for delivering calling station data representative of the originating calling station from which the call is placed, a method of operating the network for verifying the identity of the caller, said method comprising the steps of:

storing in memory associated with the network at least one reference utterance of at least one caller in association with calling station data of a calling station;

when a call is placed over the network from said calling station, retrieving said at least one reference utterance using the associated calling station data delivered over the network;

comparing a current utterance spoken by the caller placing said call and transmitted over the network with said at least one reference utterance;

determining whether said current utterance matches said at least one reference utterance; and completing said call over the network if said current utterance matches said at least one reference utterance.

5. The method as set forth in claim 4, said storing step including the step of storing a plurality of reference utterances of a respective plurality of callers in association with calling station data of a calling station, said retrieving step including the step of retrieving said reference utterances, said comparing step including the step of comparing said current utterance with each of said reference utterances, said determining step including the step of determining whether said current utterance matches any one of said reference utterances, and said completing step including the step of completing said call only if said current utterance matches one of said reference utterances.

6. The method as set forth in claim 4, said calling station data including the ANI of the calling station, said storing step including the step of storing said at least one reference utterance in association with the ANI of the calling station, said retrieving step including the step of retrieving said at least one reference using the ANI of the calling station.

7. The method as set forth in claim 4, said storing step including the step of assigning a passcode to the caller and storing said reference utterance as the caller uttering said passcode.

8. The method as set forth in claim 4, said storing step including the step of storing said at least one reference utterance as a voice template.

9. In a telecommunications network operable for completing a call placed by a caller and for delivering calling station data representative of the originating calling station from which the call is placed, an apparatus for verifying the identity of the caller, said apparatus comprising:

memory means for storing at least one reference utterance of at least one caller in association with calling station data of a calling station; and control means coupled with the network and with said memory means for retrieving said at least one reference utterance using the calling station data delivered over the network when a call is placed over the network from said calling station, said control means including means for comparing a current utterance spoken by the caller placing said call which is transmitted over the network to said at least one reference utterance, means for determining whether said current utterance matches said at least one reference utterance, and means for completing said call over the network if said current utterance matches said at least one reference utterance.

10. The apparatus as set forth in claim 9, said memory means including means for storing a plurality of reference utterances of a respective plurality of callers in association with calling station data of a calling station, said control means including means for retrieving said plurality of reference utterances, said comparing means including means for comparing said current utterance with each of said reference utterances, said determining means including means for determining whether said current utterances matches any one of said reference utterances, and said completing means including means for completing said call only if said current utterance matches one of said reference utterances.

11. The apparatus as set forth in claim 9, said calling station data including the ANI of the calling station.

12. The apparatus as set forth in claim 9, said reference utterance including a passcode assigned to the caller.

13. The apparatus as set forth in claim 9, said at least one reference utterance being stored in said memory means as a voice template.

14. The apparatus as set forth in claim 9, said control means including a voice server.

* * * * *